United States Patent [19]

Atherton et al.

[11] Patent Number: 4,806,847
[45] Date of Patent: Feb. 21, 1989

[54] DIELECTRIC LIQUID LEVEL SENSOR AND METHOD

[75] Inventors: Kim W. Atherton, Kirkland; Charles R. Clow, Bothell; Patrick H. Mawet, Everett, all of Wash.

[73] Assignee: Caterpillar Inc., Peoria, Ill.

[21] Appl. No.: 939,534

[22] Filed: Dec. 9, 1986

[51] Int. Cl.4 .................. G01R 27/26; G01F 23/26
[52] U.S. Cl. .................. 324/61 P; 324/61 R; 324/60 CD; 73/304 C; 340/620
[58] Field of Search ............ 324/61 P, 61 R, 60 CD; 73/304 C, 304 R, 1 R; 340/59, 618, 620; 361/284

[56] References Cited

U.S. PATENT DOCUMENTS

| | | | |
|---|---|---|---|
| 3,543,046 | 11/1970 | Tiffany | 73/304 C |
| 4,080,562 | 3/1978 | Rubel et al. | 324/60 C |
| 4,392,378 | 7/1983 | Pitches et al. | 73/304 C |
| 4,418,569 | 12/1987 | Kühnel | 324/61 P X |
| 4,418,571 | 12/1983 | Asmundsson et al. | 73/304 C |
| 4,467,646 | 8/1984 | Berryman et al. | 73/304 C |
| 4,528,839 | 7/1985 | Blanchard et al. | 73/304 C X |
| 4,621,227 | 11/1986 | Venema | 324/60 CD |

Primary Examiner—Reinhard J. Eisenzopf
Assistant Examiner—Jack B. Harvey
Attorney, Agent, or Firm—Robert E. Muir

[57] ABSTRACT

A sensor for sensing the level of oil or transmission fluid under both normal and extreme temperature conditions. The only active components of the sensor have input and leakage currents substantially lower than those of diodes and current sources under high temperature conditions. The sensor has a probe, including a pair of electrodes forming a level detecting capacitor, adapted to extend in the vessel to detect the level of the liquid. A reference capacitor is included which has a capacitance substantially the same as the capacitance of the level detecting capacitor when no dielectric liquid is present between the electrodes of the level detecting capacitor. Circuitry is provided for measuring the capacitance of each capacitor and for deriving from the capacitance measurements a signal proportional to the level of the dielectric liquid at the sensor. Circuitry is also provided for testing whether the reference capacitor is operating properly. One of the electrodes of the level detecting capacitor is insulated to render the output of the sensor independent of high temperature conductivity effects. Structure and a method are provided for compensating for varying dielectric constants of the oil or transmission fluid in which the sensor is immersed.

53 Claims, 5 Drawing Sheets

DIELECTRIC LIQUID LEVEL SENSOR AND METHOD

BACKGROUND OF THE INVENTION

This invention relates to sensors for sensing the level of a dielectric liquid and more particularly to such sensors for sensing the level of oil, transmission fluid or the like under normal and extreme temperature conditions.

It is desirable in many situations to detect the actual level of a dielectric liquid in a range of possible levels, as opposed to detecting the presence or absence of the dielectric liquid at one predetermined level. Such situations for example include the detection of level of fuel in a fuel tank for an internal combustion engine. Other such dielectric liquids include engine oil and transmission fluid, both also commonly used in connection with internal combustion engines. It should be appreciated that the detection of the actual level of certain dielectric liquids such as oil and transmission fluid is far more difficult than the detection of the level of engine fuel due to the more extreme environmental conditions encountered in engines and transmissions.

Sensors for detecting the actual level of oil and transmission fluid must be capable of accurately sensing the level of oil and transmission fluid over a wide range of temperatures. Moreover, this wide range of temperatures can be encountered with a few minutes during starting and operation of an internal combustion engine. Temperatures for such sensors can easily go from ambient up to 150° C. in engines and to 200° C. in transmissions. Clearly fuel level sensors to do not normally encounter these temperature extremes. Another unique feature involved in measurement of the level of dielectric fluids such as oil and transmission fluid is the fact that the level itself changes substantially once the internal combustion engine is started. While the engine is at rest, the oil or transmission fluid pools in the lowest parts of their respective blocks and housings. However, once the engine is started the oil is sent throughout the engine block and the transmission fluid is dispersed throughout its housing. During running conditions, it is not as important to known the actual level of the oil or transmission fluid, but it is vitally important to known whether there has been a catastrophic loss of such oil or fluid. Present sensors are not believed to provide both high accuracy during the period before starting, and adequate warning of catastrophic loss, in a sensor of reasonable size and cost.

Various oil level sensors are currently used in automotive and related applications to supply oil level information to engine control systems, including computerized control systems. Such information is particularly important in the case of heavy equipment such as mining and other heavy construction equipment. The working environment of the engine and transmissions in these cases is particularly harsh and the equipment is expensive. Although the present invention is especially suited to such environments, it is not so limited.

Some sensors which are currently in use to sense the oil level in internal combustion engines are known as thermal dissipation sensors. These sensors are relatively low in cost and are relatively easy to interface with control systems, but they do have certain features which could be improved. For example, the power consumption of thermal dissipation sensors is undesirably high. In addition, these sensors tend to cause the amount of carbon in the oil to increase, which is not desirable. Furthermore, when such sensors are used in transmissions to detect the level of the transmission fluid, they are adversely affected by the spray present in a transmission whenever it is running.

Float switches are also used for oil level sensing and these switches are relatively low in cost. However, float switches are not particularly reliable and they suffer from a limited operating temperature range. Mechanical or optical sensor such as dip sticks and sight glasses have also been used as oil level and transmission fluid level sensors, but these latter sensors are relatively inconvenient to use and they do not interface well with electronic or computerized control systems. Their utility is further reduced because of the fact that they must in general be read manually.

A capacitive probe sensor is also available for sensing oil level. It has the advantage of being a low power consuming device, but it does suffer from a reduced operating margin. That is, present capacitive probes are not believed to adequately discriminate between the minute capacitance changes occuring as oil levels change, and the other error-causing effects which occur due to the extended range of operating conditions of the engine itself.

Capacitive sensors suffer from the fact that a relatively low capacitance is being measured (which is a result of the limited space available). Moreover, the electronics for present capacitive probe sensor are believed to be too expensive for widespread use in low-cost applications such as automotive applications. This low capacitance and the cost considerations require that any interface circuit between the sensor and a control system be built as part of the sensor itself. The accuracy of present capacitive sensors is also believed to be affected by the fact that the dielectric constant of the oil or transmission fluid is a function of temperature so that the capacitance measured by the sensor will vary as the temperature of the oil or transmission fluid varies.

In addition, the conductance of various oils and transmission fluids also varies with temperature in a way that affects the output of capacitive sensors. This conductivity variation makes necessary either special circuitry for detecting the imaginary component of the output to eliminate errors caused by conductivity or special constant current charging of the capacitive sensor. Both approaches introduce undesirable cost. In addition, in the latter approach, errors are introduced due to the switching required to charge and discharge the capacitors. This makes it difficult to obtain good stability within a large operating temperature range, particularly when small capacitance values are involved.

Also, at high temperatures, various semiconductor components such as diodes and transistors which one would normally incorporate in an interface circuit have relatively large leakage currents which provide another source of error. In addition, stray capacitances introduce errors, as does the use of discrete components in the detection circuitry (due to minor mismatches in the responses of the discrete components with variations in temperature and with the passage of time). It is also the case that the dielectric constants of various oils and transmission fluids vary from oil to oil and fluid to fluid so that the output of a capacitive sensor representing the supposed level of the oil or transmission fluid could vary depending the particular oil or transmission fluid present.

SUMMARY OF THE INVENTION

Among the various objects and features of the present invention may be noted the provision of a sensor for sensing the levels of dielectric liquids such as oils, transmission fluids and the like, which sensor has a relatively stable output over a wide temperature range.

Another object of the present invention is the provision of such a sensor which is relatively economical in construction.

A third object of the present invention is the provision of such a sensor which is capable of indicating both normal levels of the oil or transmission fluid and catastrophic loss of such oil or fluid.

A fourth object of the present invention is the provision of such a sensor which is especially suited for use in heavy equipment.

A fifth object of the present invention is the provision of such a sensor which has relatively low power consumption.

A sixth object of the present invention is the provision of such a sensor which is reliable, convenient to use and interfaces well with control systems.

A seventh object of the present invention is the provision of such a sensor which is relatively insensitive to the dielectric constant of the particular dielectric liquid whose level is being measured.

An eighth object of the present invention is the provision of such a sensor which has relatively little error introduced by its interface circuit.

A ninth object of the present invention is the provision of such a sensor which is relatively easy to calibrate.

A tenth object of the present invention is the provision of such a sensor with detection electronics small enough to be installed inside the sensor itself.

An eleventh object of the present invention is the provision of such a sensor which economically compensates for dielectric constant and conductivity variations.

A twelfth object of the present invention is the provision of such a sensor which is usuable without modifications to sense the level of liquids having a wide range of dielectric constants.

A thirteenth object of the present invention is the provision of such a sensor which has a single output directly proportional to the liquid level.

A fourteenth object of the present invention is the provision of such a sensor in which all capacitors involved in the sensing are at the same instantaneous voltage at all times.

Other objects and features will be in part apparent and in part pointed out hereinafter.

Briefly, in a first feature the sensor includes a sensor body adapted to be mounted with respect to a vessel containing the dielectric liquid whose level is to be measured. A probe, including first and second electrodes forming a level detecting capacitor, is secured to the sensor body and is adapted to be at least partially immersed in the liquid, when liquid is present, to detect the level of the liquid. A reference capacitor related to the level detecting capacitor is disposed in the sensor such that its capacitance is not affected by the presence or absence of the dielectric liquid. The capacitance of the level-detecting reference capacitor is substantially the same as the capacitance of the level detecting capacitor when no dielectric liquid is present between the electrodes of the level detecting capacitor. Oscillator means are mounted in the sensor for applying a voltage waveform to each of the capacitors, the capacitors being fully charged during one portion of each cycle of the waveform and discharging during a second portion of each cycle. Means are provided for measuring the capacitance of each capacitor by determining the time it takes to discharge below a reference level. The capacitance of the level detecting capacitor is a function of the level of the dielectric liquid in which the level detecting capacitor is immersed. The measuring means has an output signal with a parameter such as voltage, pulse width or the like which is proportional to the measured capacitance. First subtracting circuitry subtracts the signal parameter representing the capacitance of the level-detecting reference capacitor from the signal parameter representing the capacitance of the level detecting capacitor to give a signal proportional to the level of the dielectric liquid at the sensor. The oscillator means, measuring means and subtracting means consist essentially of components which have input currents substantially lower than those of diodes and current sources under high temperature conditions, whereby the level of the dielectric liquid sensed by the sensor is relatively unaffected by the temperature of the liquid.

In a second feature, the sensor also includes circuitry for testing whether the reference capacitor is operating properly.

In a third feature, at least one of the electrodes is insulated so that the apparent capacitance of the level detecting capacitor is relatively insensitive to any change in the conductivity of the dielectric liquid at high temperatures. A first reference capacitor related to the level detecting capacitor is disposed in the sensor such that its capacitance is not affected by the presence or absence of the dielectric liquid. The capacitance of the level detecting reference capacitor is substantially the same as the capacitance of the level detecting capacitor when no dielectric liquid is present between the electrodes of the level detecting capacitor. A third electrode is disposed in the probe at a position in which the third electrode is normally surrounded by the dielectric liquid. The third electrode is radially spaced from and coaxial with one of the first and second electrodes to form a third, dielectric liquid filled capacitor whose capacitance is normally a function of the dielectric constant of the particular dielectric liquid whose level is being sensed. A second reference capacitor related to the dielectric filled capacitor is disposed in the sensor such that its capacitance is not affected by the presence or absence of the dielectric liquid. The capacitance of the second reference capacitor is substantially the same as the capacitance the dielectric filled capacitor would have if no dielectric liquid were present between the electrodes of the dielectric filled capacitor. Circuitry is provided for measuring the capacitance of each capacitor, for deriving from the capacitance measurements of the level detecting capacitor and the first reference capacitor a signal proportional to the level of the dielectric liquid at the sensor, and for deriving from the capacitance measurements of the dielectric liquid filled capacitor and the second reference capacitor a signal proportional to the dielectric constant of the dielectric liquid. The ratio of the signals from the first deriving means and the second deriving means is independent of the dielectric constant of the dielectric liquid whose level is being measured.

In another aspect of the present invention, a sensor includes a sensor body adapted to be mounted with respect to a vessel containing the dielectric liquid whose level is to be measured. A probe, including first and second electrodes forming a level detecting capacitor, is secured to the sensor body and is adapted to extend in the vessel so as to at least partially immerse the capacitor in the liquid, when liquid is present, to detect the level of the liquid. Circuitry is included for measuring the capacitance of the capacitor and for deriving from the capacitance measurement a signal proportional to the level of the dielectric liquid at the sensor. The first and second electrodes are radially spaced apart and are coaxial with each other. The second electrode is interior of the first electrode and the spacing between the two electrodes has at least two significantly different values as measured at different longitudinal positions along the probe so that the capacitance of the level detecting capacitor per unit length varies longitudinally along the probe.

The method of the present invention relates to a sensor system including a probe positionable in a vessel such as the housing of a transmission for a vehicle, which housing contains dielectric liquid such as oil, transmission fluid or the like whose level is to be measured, said liquid fully covering the probe at least at some time during the operation of the sensor. The probe of the system further has a pair of electrodes forming a level detecting capacitor. The method includes the steps of disposing the probe at a level in the vessel at which the level detecting capacitor has the dielectric liquid substantially filling the space between the two electrodes at some first time during the operation of the sensor. The capacitance of the level detecting capacitor is measured during the first time when the dielectric liquid substantially fills the space between the two electrodes and it is also measured at some second time such as during operation of the equipment during which the dielectric liquid does not completely fill the space between the electrodes. The capacitor value obtained when the space is filled is used to calibrate the capacitance measurement obtained at the second time.

The system for detecting the level of a dielectric liquid includes first, second, third and fourth capacitors. The first capacitor has a pair of electrodes disposed so that the dielectric liquid whose level is to be measured may flow between the electrodes, so that the capacitance of the first capacitor varies with the level of the dielectric liquid. The second capacitor is closed so that its capacitance is independent of the level of the dielectric liquid. The capacitance of the second capacitor is a reference generally equal to the capacitance of the first capacitor in air with no dielectric liquid present between its electrodes. The third capacitor has a pair of electrodes immersed in the dielectric liquid, so that the capacitance of the third capacitor is a function of the dielectric constant of the liquid rather than of the level of the liquid. The fourth capacitor is closed so that its capacitance is independent of the level of the dielectric liquid. The capacitance of the fourth capacitor is a reference generally equal to the capacitance of the third capacitor in air with no dielectric liquid between its electrodes. Circuitry is included for applying a waveform to all four capacitors in such a manner that all four capacitors are at substantially the same instantaneous voltage during charging, so that the capacitance of each capacitor is directly reflected in the charging current flowing into that capacitor. The circuitry is responsive to the charging currents for generating an output signal directly proportional to the level of the dielectric liquid.

BRIEF DESCRIPTION OF THE DRAWINGS

Similar reference characters indicate similar parts throughout the several views of the drawings.

DESCRIPTION OF THE PREFERRED EMBODIMENTS

Figures 1, 2:
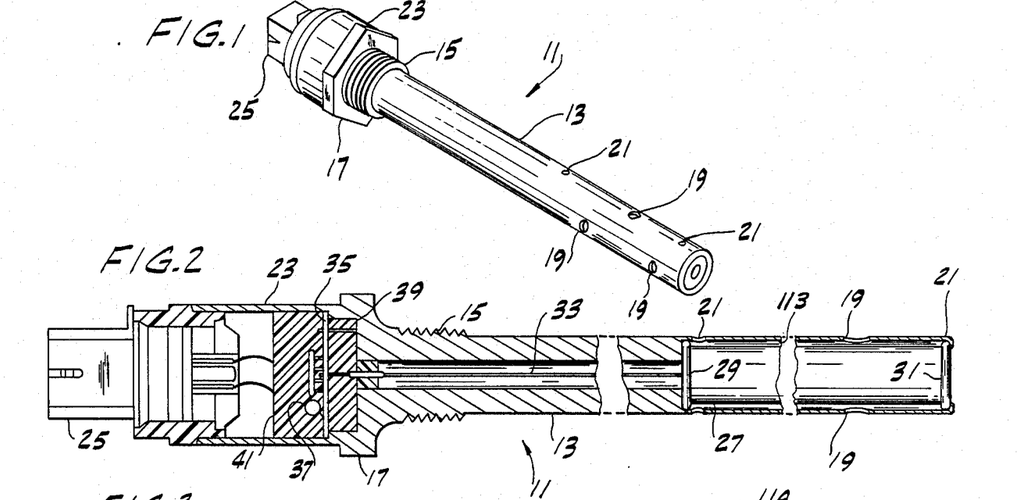
FIG. 1 is a perspective view of the one embodiment of a sensor of the present invention.
FIG. 2 is a longitudinal sectional view on an enlarged scale of the sensor of FIG. 1.

A sensor 11 of the present invention particularly suitable for sensing the actual level of oil in a vessel such as the block of an internal combustion engine (not shown) includes an elongate probe 13 terminating at its proximal end in a threaded surface 15 suitable for screwing the sensor 11 into the block of an internal combustion engine by means of a hexagonal wrench engaging surface 17. Probe 13 includes a plurality of holes or orifices 19 which permit engine oil to enter the probe generally in the distal half thereof so that the actual level of the oil can be measured. Smaller holes 21 are provided above and below orifices 19 to allow air to escape from the interior of the probe and to allow oil to escape from the interior of the probe when the level of the oil has fallen away from probe 13. The sensor 11 includes a sensor body 23 and terminates at its proximal end in a suitable connector 25 such as the Packard-type connector shown.

Probe 13, threads 15, hexagonal wrench engaging surface 17, and sensor body 23 are integrally formed (FIG. 2) of a suitable material such as brass. Probe 13 is cylindrical and extends distally from threads 15. The distal end of probe 13 is hollow and disposed therein is a smaller cylindrical electrode 27 which is concentric with the wall of the probe itself. A pair of discs 29 and 31 support electrode 27 at each end and secure it against movement with respect probe 13. Discs 29 and 31 are made of an insulating material such as a suitable plastic or ceramic. The inner surface 113 of the hollow portion of probe 13 is utilized as another electrode spaced a predetermined distance from electrode 27 to form a dielectric liquid level sensing capacitor designated CP in FIG. 8. The extreme distal end of probe 13 is crimped over insulating disc 31 to hold the assembly of electrode 27 and the two ceramic discs in place.

Orifices 19 and 21 are all in fluid communication with the space between electrodes 27 and probe 113 so as to promote free movement of the engine oil into the space between the two electrodes of the level sensing capacitor. Electrode 27 is connected electrically by a wire 33, which extends down a hollow central bore of probe 13, to a circuit board 35 carrying an interface circuit 37 of the present invention. Probe 13 is also electrically connected to interface circuit 37 by a suitable wire 39. Interface circuit 37 is suitably potted in a hollow interior of sensor body 23 by a suitable material 41 such as epoxy. Interface circuit 37 is electrically connected with the pins (not shown) of connector or plug 25 so that the signal from the interface circuit may be supplied to a control system or the like as desired.

Sensor 11, as is explained below, detects the actual level of oil in the engine block to which it is threadingly secured by measuring the capacitance change in the capacitor formed by electrodes 27 and 113. As the level of the oil in the space between electrode 27 and 113 increases, the capacitance of this level sensing capacitor increases as well. Likewise, as the level of oil in the space between electrode 27 and 113 goes down the capacitance decreases.

The output of sensor 11 is largely immune to temperature changes in part because electrode 27 is preferably metal with an insulated layer over nearly its entire surface area. Anodized aluminum works well as the material for electrode 27, since the insulation formed by the anodizing is durable and easy to fabricate. It has been found that various oils begin to conduct electricity to a slight but significant degree at elevated temperatures such as are typical of internal combustion engines. As a result, the oil which functions solely as a dielectric at room temperature becomes a conductor (albeit a poor one) at elevated temperatures and the conductivity effects begin to mask the dielectric constant/capacitive effects which sensor 11 is designed to detect. Insulating electrode 27 solves this problem and results in a sensor 11 with increased temperature stability.

Figure 3:
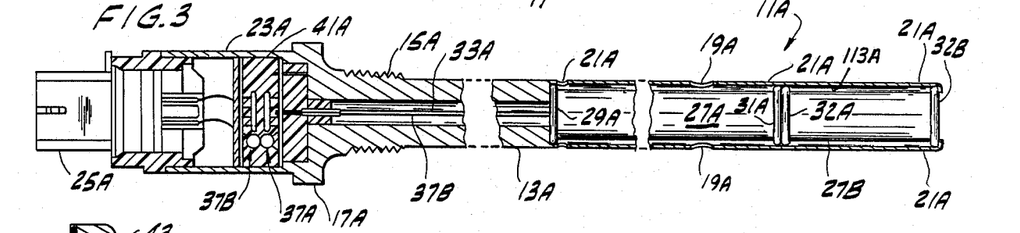
FIG. 3 is a longitudinal sectional view of a second embodiment of the sensor of the present invention.

Even though the dielectric constant of oil is largely immune to changes in temperature, the additives present in various oils cause significant variations in dielectric constant from one oil to another. Thus, if it is desired to have a sensor which will be used with a number of different oils having various dielectric constants, it would be preferable for increased accuracy to use a sensor 11A (FIG. 3). Sensor 11A differs significantly from sensor 11 only in two respects. First, it includes in addition to a liquid level sensing electrode 27A, a second electrode 27B which is used to compensate for the dielectric constant of the particular oil whose level is being measured. Electrode 27B is disposed adjacent electrode 27A and coaxial with probe 13A although other configurations are possible. It is held in place by a pair of insulating discs 32A and 32B.

Figures 6, 7, 8:
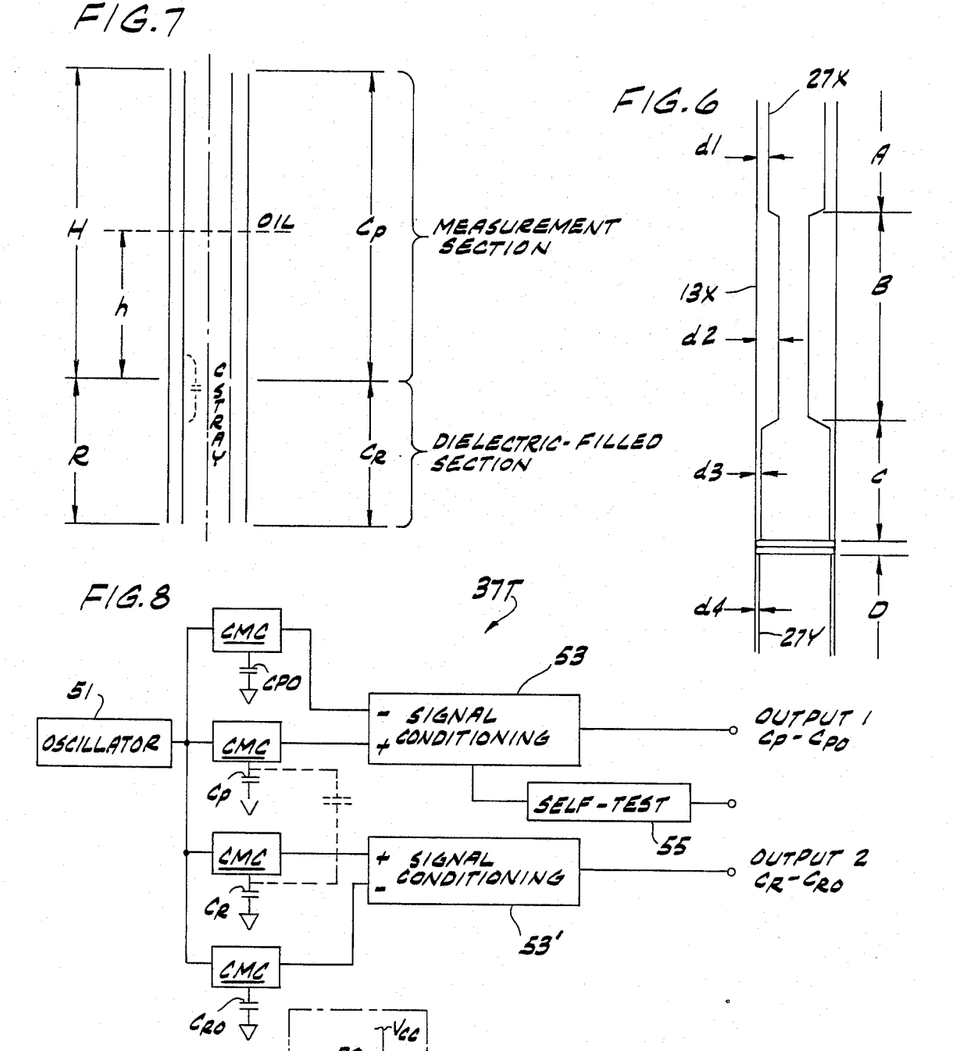
FIG. 6 is a schematic diagram of an alternative construction of a capacitive probe of the present invention.
FIG. 7 is a diagram illustrating the regions of operation of the sensor of FIG. 3.
FIG. 8 is a block diagram illustrating one embodiment of interface circuitry of the present invention.

Electrode 27B is disposed at a position along probe 13A in which it is surrounded by oil during normal operations. Other configurations, discussed below in connection with FIG. 6, are used to ensure that oil remains between electrode 27B and the wall of the probe even when the oil level falls somewhat below the top of electrode 27B. Electrodes 27B and 113A thus form a dielectric filled capacitor whose capacitance is a function of the dielectric constant of the particular oil and not a function of the level of the oil. For sensor 11A of FIG. 3 the electrode 27B is disposed at the distal end of the probe. Such a design is used when the sensor itself is disposed generally vertically with the distal end of the probe being at the lowest point. If a sensor were disposed vertically with the distal end of the probe being at the highest point, the dielectric sensing electrode 27B would be disposed not at the distal end as shown in FIG. 3 but at the proximal end of probe 13. That is, for any particular application the dielectric sensing electrode 27B is disposed at a position where during normal operation it is always surrounded by oil. Alternatively, the structure of FIG. 6, region D, may be used to provide the desired amount of oil around electrode 27B even when the oil level falls significantly below the top of that electrode. Electrode 27B is connected by a suitable wire 33B disposed in the hollow bore of probe 13A to a second interface circuit 37B which also is suitably potted by a material 41A such as epoxy.

Although the sensors 11 and 11A are particularly suitable for use in sensing the actual level of engine oil, the present invention is not so limited. Similar sensors 11B (FIG. 4) and 11C (FIG. 5) are useful in measuring the level of transmission fluid. Sensor 11B includes a sensor body 23B having formed therein a number of openings 43 suitable for securing the sensor to the housing of a transmission or the like such that the probe 13B is disposed inside the housing. Optionaly an insulator 44 is provided between sensor body 23B and the housing to electrically isolate the sensor body from the housing. Probe 13B extends distally from body 23B and is hollow at its distal end.

Figures 4, 5:
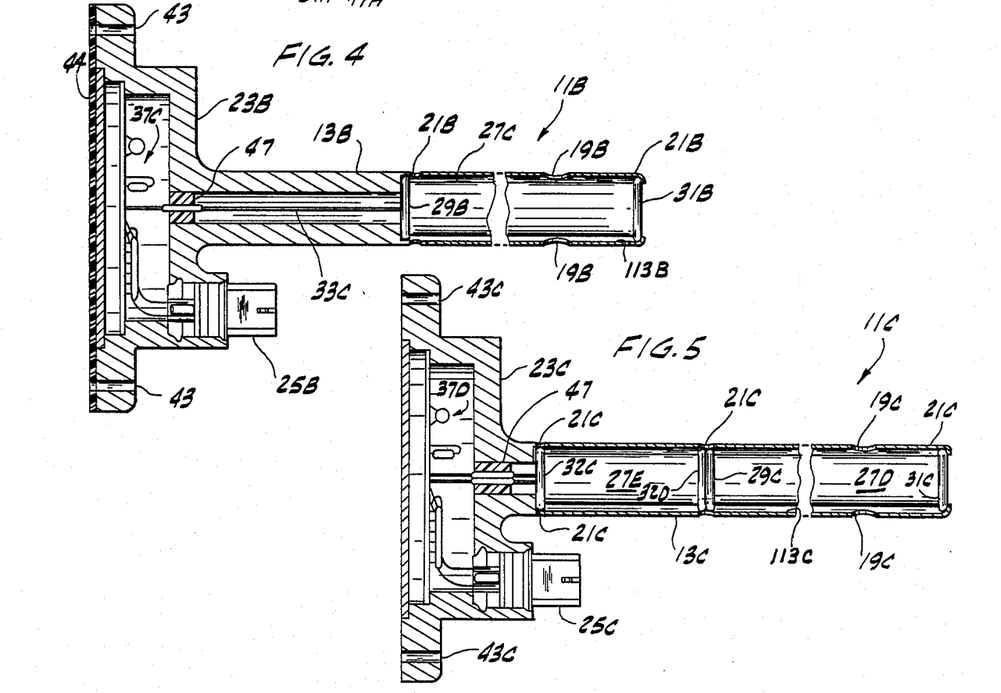
FIG. 4 is a longitudinal sectional view of a third embodiment of the sensor of the present invention.
FIG. 5 is a longitudinal sectional view of a fourth embodiment of the sensor of the present invention.

A dielectric liquid level sensing electrode 27C is disposed in the hollow end of probe 13B in the same manner as electrode 27 is disposed in the hollow end of probe 13 of sensor 11. Electrode 27C is connected by a suitable wire 33C disposed in the central bore of probe 13B to an interface circuit 37C disposed in sensor body 23B. The signal from the interface circuit is supplied as desired via a plug or connector 25B. Of course, since the electrode 27C is hollow, the circuitry may be disposed inside the electrode instead of in a separate portion of the sensor body if desired.

FIG. 5 illustrates a transmission fluid level detector which includes a second electrode 27E which is disposed in probe 13C such that it is normally surrounded by the transmission fluid. This particular embodiment of the sensor is used in those situations where it is desirable that the sensor have an output which is relatively independent of the dielectric constant of the particular transmission fluid being used. Electrode 27E is disposed adjacent a level sensing electrode 27D, both of which are disposed in probe 13C and spaced therefrom to form a pair of capacitors. The signals from electrodes 27D and 27E are supplied to an interface circuit 37D which supplies an output signal to a control system or the like over a connector 25C. As is also the case with sensor 11B, the hollow interior bore of the probe itself is plugged with a suitable material 47 such as epoxy so that any fluid present inside the respective probes does not enter the space occupied by the interface circuits 37C and 37D.

Sensors 11, 11A, 11B and 11C have been illustrated with a constant spacing between the electrode 27 and the inner surface or shell of probe 13. An alternative to this construction is shown in FIG. 6. In this alternative construction an inner electrode 27X is generally cylindrical but has a cross sectional area which varies longitudinally along a probe 13X. In a first region A which corresponds to the desired measuring range of the sensor, electrode 27X has a relatively large cross section, and a correspondingly small gap d1 (of, e.g., 0.060") between it and the wall of probe 13X. In region A, therefore, the sensor is relatively sensitive to changes in the level of the dielectric liquid because of the relatively small gap.

Below region A is a second region B in which the electrode 27X has a relatively small cross section and a correspondingly large gap d2 of, e.g., 0.080" to 0.090" or larger. The sensor is relatively insensitive to level changes taking place in region B (which is a region where no normal level of the oil occurs) because of the much larger gap. Below region B is a third region C in which the cross section of electrode 27X is generally larger than that of region A and the gap d3 is relatively smaller (e.g., 0.040"). In region C the sensor is very sensitive to small changes in the level of the dielectric liquid because this is the region of "low oil alarm." It should be appreciated that 27X can be configured with a multiplicity of diameters to obtain any desired sensitivity profile. One such preferable profile is the case where the total capacitance provide by the gaps of 27X is substantially equal (within about 25% or so) to the total capacitance of 27Y because this profile helps reduce conductivity induced errors through "common mode error" rejection.

The construction of FIG. 6 is particularly useful since region A corresponds to the range of levels where one expects the dielectric liquid to be when the engine or transmission is at rest and suitable for reliable measurement, region B corresponds to the range of levels occurring when the engine or transmission is operating and thus usually unsuited for reliable measurement, and region C corresponds to the range of levels which would indicate a catastrophic loss of oil or transmission fluid. It is important to known accurately the total amount of oil or transmission fluid in the system, and this information is obtained when the engine or transmission is at rest. It is less important to known the precise level during operation of the equipment since the oil and transmission fluid are dispersed throughout their respective mechanisms during operation. However, even during operation it is important to know that the liquid level has dropped so far that the catastrophic loss region C has been reached. This particular construction therefore permits this information to be sensed over a suitably small range of capacitance.

Also shown in FIG. 6 is an electrode 27Y which forms part of the dielectric-filled capacitor used as described above to compensate for the dielectric constant of the particular oil being used. The gap d4 between electrode 27Y and the probe wall 13X in this region D of the probe is reduced to the minimum which will allow oil exchange between the outside of the probe and the space between electrode 27Y and probe wall 13X (about 0.020") This small gap increases the capacitance of the reference capacitor, but more importantly this gap is so small that it causes a maximum cling effect (the tendency of the oil to remain in the gap even aft the oil outside the probe has fallen below that level). That is, the gap is so small that the height that oil remains clinging around the electrode is at a maximum. This allows the dielectric compensating capacitor to stay full, even when the external oil level is reduced below the top of the compensating capacitor. This feature produces more reliable operation for the electronics.

The various capacitances associated with the sensors of FIGS. 3 and 5 are illustrated in FIG. 7. Assuming that the two electrodes (e.g., electrodes 27A and 113A) which make up each capacitor are cylindrical and coaxial, the capacitance of the dielectric filled capacitor CR of height R is A*K(liquid)*R, where A is a constant depending upon the permitivity of free space, the inner radius of the outer electrode and the outer radius of the inner electrode, and where K(liquid) is the dielectric constant of the oil, transmission fluid, or other dielectric liquid whose level is being measured. The capacitance of the measurement capacitor CP of height H with a portion "h" thereof immersed in oil or transmission fluid is A*K(liquid)*h plus A*(H−h). There is also some stray capacitance CSTRAY between electrode 27A, electrode 27B and ground and between the two electrodes themselves.

A first embodiment of a typical interface circuit 37T (FIG. 8) for the configuration of FIG. 7 includes a pair of reference capacitors CRO and CPO. These capacitors are disposed in the sensor body on a circuit board and are preferably NPO-type capacitors which are not significantly affected by temperature. These are closed capacitors so that their capacitance does not depend upon the presence or level of the dielectric liquid around the sensor probe. Capacitor CRO has a capacitance substantially equal to the free air capacitance of capacitor CR. That is, it has a capacitance equal to the capacitance capacitor CR would have were there no dielectric liquid between its electrodes. Similarly capacitor CPO has a capacitance substantially equal to the free air capacitance of capacitor CP. The capacitances of capacitors CPO and CRO, if properly selected, can function to compensate for the sray capacitance CSTRAY.

The basic measurement technique of interface circuit 37T is to employ an oscillator 51 to charge and discharge all four capacitors CP, CR, CPO, and CRO. A set of four capacitance measurement circuits CMC measure the capacitance of the four capacitors. The output of the measurement circuit for capacitor CPO is substracted from the output of the measurement circuit for capacitor CP by a signal conditioning circuit 53 to provide a signal proportional to the height "h" of the dielectric liquid. Specifically, the difference in the capacitances equals A*h*(K(liquid)−1).

Similarly a second signal conditioning circuit 53' subtracts the output of the measurement circuit for capacitor CRO from the output of the measurement circuit for capacitor CR to provide a signal whose only variable is the dielectric constant of the liquid whose level is being measured. Specifically this difference equals A*R*(K(liquid)−1). These signals are supplied on two output pins to an additional control or measurement system (not shown). This additional system then takes the ratio of the two signals, which ratio equals h/R. Note that this ratio is independent of all circuit parameters and of the dielectric constant of the dielectric liquid. It directly relates the oil level to the length of the dielectric liquid filled section of the sensor. If one is not concerned with the possible variation in the dielectric constant of the oil or transmission fluid being measured, one can omit the dielectric filled capacitor CR and its associated reference CRO. This results in an error of roughly four to seven per cent for most common oils. In such a configuration, only two capacitance measuring circuits CMC and one signal conditioning circuit 53 are required. Interface circuit 37% also includes a self-test circuit 55, described below.

As will become apparent, considerable care is taken in the design of interface circuit 37T and in the selection of components therefor so that the operation of the sensor of the present invention is relatively insensitive to temperatures such as the 200 degree Celsius temperatures encountered in transmissions. The interface circuit uses neither diodes not current sources, which cause problems at high temperatures due to their leakage currents. The interface circuit does include a number of comparators which are selected on the basis of their low input currents in the desired temperature range.

Figure 9:
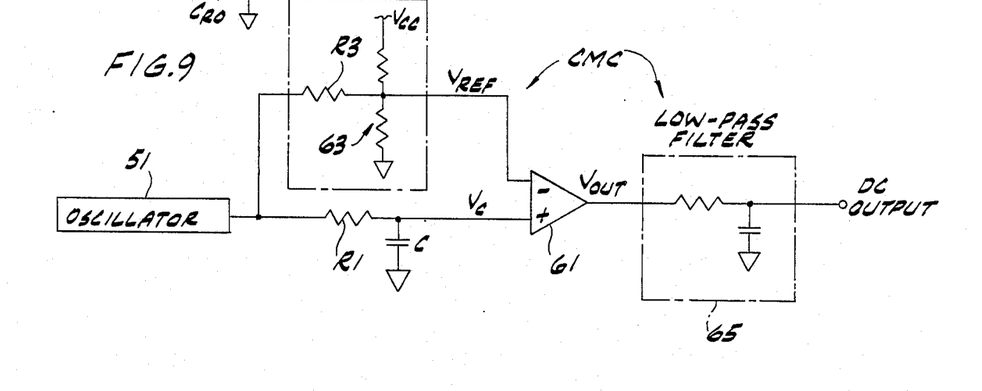
FIG. 9 is an electrical schematic of one embodiment of capacitance measuring circuitry of the present invention.
Figure 10:
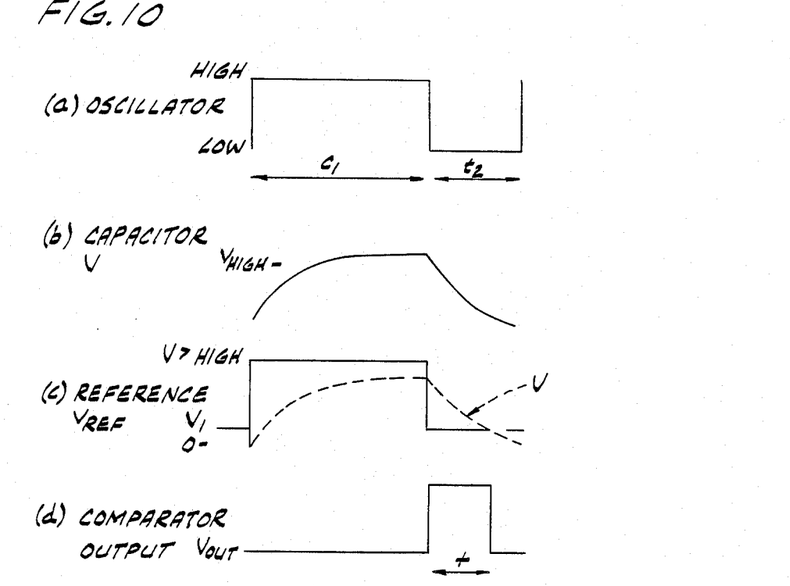
FIG. 10 is a graphical representation of the operation of the circuitry of FIG. 9.

The operation of each capacitance measurement circuit CMC is illustrated in FIGS. 9 and 10. Oscillator 51 provides a waveform, specifically an asymmetrical square wave having an "on" or "high" period $t_1$ of a greater duration than a "low" or "off" period $t_2$, to the capacitor connected to that particular capacitance measurement circuit. The particular frequency of the square wave depends upon the capacitance of the probe being measured. The longer time $t_1$ is designed to ensure that the measured capacitor fully charges during period $t_1$. Oscillator 51 is a relaxation oscillator which has as its only active components operational amplifiers or comparators having low input currents in the desired temperature range. The square wave is supplied through a resistor R1 to the capacitor C whose capacitance is being measured, so that the capacitor is part of an RC network. The voltage on the capacitor rises to the charging voltage as shown in FIG. 10,(b). This voltage on capacitor C is supplied to the positive input of a comparator 61. During this time the high voltage from the oscillator is also supplied through another resistor R3 to the negative input of comparator 61, so that the output of comparator 61 stays low during the period $t_1$ of the oscillator.

During period $t_2$ of the oscillator, however, the voltage on the negative input of the comparator drops to some reference voltage VREF selected to be much less than the charging voltage. Voltage VREF is supplied from a voltage divider 63 connected to the negative input of the comparator. During period $T_2$ the voltage on capacitor C falls, but it remains above the voltage reference for a length of time which is proportional to the capacitance of the capacitor, as determined by the time constant of resistor R1 and capacitor C. The output of the comparator is thus a pulse such as shown in FIG. 10,(d), whose width represents the capacitance of the capacitor. The output of comparator 61 is supplied to a low-pass filter 65 to provide a direct current voltage output of the measurement circuit which voltage is proportional to the capacitance being measured.

Signal conditioning circuit 53 (FIG. 11) includes a pair of input resistors R5 connected between the direct current voltage ouputs from the capacitance measurement circuits and the inputs to a differential operational amplifier 67. More specifically the voltage signal representing the capacitance C of capacitor CP or capacitor CR is supplied via one of the input resistors to the noninverting input of amplifier 67 and the voltage signal representing the capacitance CREF of the reference capacitor CPO or CRO is supplied to the inverting input of the amplifier. The amplifier has a negative feedback resistor R7 connected between its output and its inverting input and a corresponding resistor R7 connected between its noninverting input and ground. The output VOUT of amplifier 67 is thus the difference signal CP−CPO or CR−CRO depending upon which signal conditioning circuit 53 is being considered. In the case of the signal conditioning circuit which determines the difference CP−CPO the self-test circuit 55 is also directly connected to the noninverting input of the amplifier 67.

Figure 11:
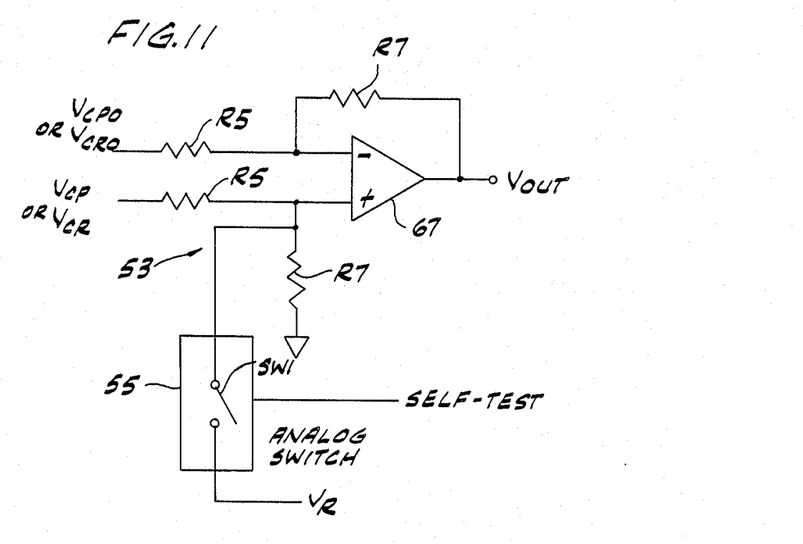
FIG. 11 is an electrical schematic of output and self-test circuitry of the present invention.

It is very important in automotive monitoring applications to have some means of verifying the proper functioning of each sensor. Most of the possible failure modes of the sensor of the present invention are detectable by an external monitoring system as abnormal voltages or an abnormal combination of voltages. One false reading is still possible: If capacitor CPO fails and the probe is empty, the input VCP minus VCPO will give a voltage approximately equivalent to a full probe. This is a failure mode which can cause damage to the engine or the transmission, so a self-test is desirable. Self-test circuit 55 provides this self test. It consists of an externally controllable analog switch SW1 connected between a voltage VR and the noninverting input of amplifier 67 of its signal conditioning circuit.

When switch SW1 is closed, the noninverting input of the operational amplifier is connected directly to reference voltage VR. If capacitor CP has failed, then the capacitance of capacitor CPO equals zero and the output of amplifier 67 equals VR*(1+R7/R5). Thus, if the output of the amplifier is greater than the reference voltage VR then the self-test reveals that the capacitor CPO, and hence the sensor, has failed. This test will also verify that CPO is operating and that the oscillator is working. If the sensor is working, the output of the amplifier is VR−(VR−VCPO)*R7/R5. If reference voltage VR is chosen smaller than the voltage VCPO representing the capacitance of capacitor CPO, the output of the amplifier will go lower than voltage VR if the capacitor and the oscillator are working properly. This is a positive self-test. Of course even though an analog switch SW1 is shown in FIG. 11 for the self-test circuit, this could readily be replaced by a field-effect transistor or a bipolar transistor, in which case the monitoring system cuold electronically initiate the self-test.

In the case of sensors 11B and 11C for transmissions, the sensor can be flooded at startup because all the transmission fluid is pooled about the sensor. Once the transmission starts in motion, the transmission fluid is dispersed about the housing and the senosr is no longer flooded. However, the external monitoring system can use the flooded condition to calibrate the sensor since at that time it knows exactly the condition of the sensor. This information can be used by the external monitoring system to replace the dielectric filled capacitor of FIG. 5 for example. Thus, the method of the present invention includes the steps of disposing the probe at a level in the vessel at which the level detecting capacitor has the dielectric liquid substantially filling the space between the two electrodes of that capacitor at some first time while the transmission is at rest. The capacitance of the level detecting capacitor is measured during the first time and it is also measured during a second time such as during operation of the equipment, during which second time the dielectric liquid does not completely fill the space between the electrodes. The capacitance value obtained during the first time is used by the external monitoring system to calibrate the capacitance measurement obtained at the second time.

As mentioned above, oil displays some significant conductivity at high temperature, making it necessary for the circuitry of such a sensor to either eliminate conductivity from the measurement or compensate for it in the detection technique in order to obtain highly accurate and reliable liquid level measurements (better than approximately seven per cent of full scale errors). Of course it is desirable that this accuracy be achieved using a small and low cost device. The circuitry of FIGS. 8, 9, and 11 functions well in these respects, but their performance can be improved even further by the circuitry shown in FIGS. 12 and 13.

Figure 12:
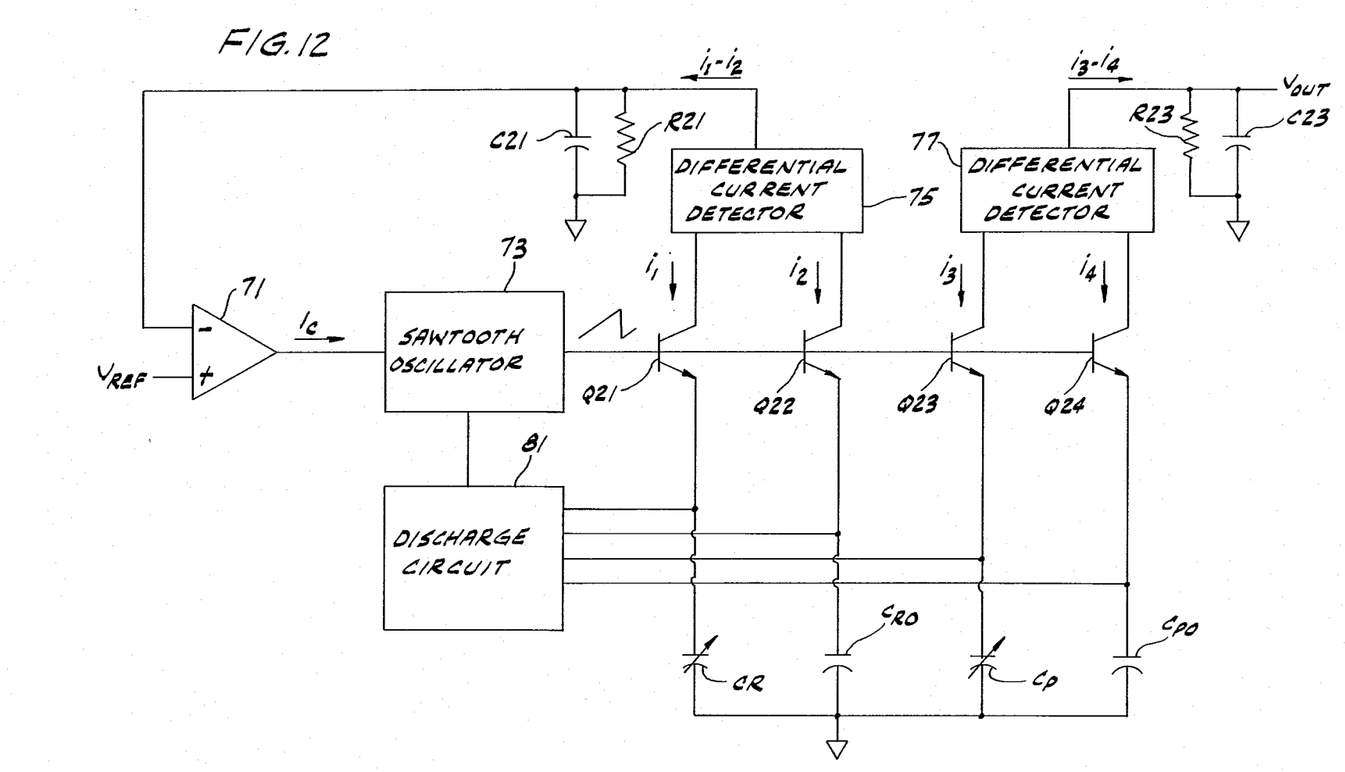
FIG. 12 is an electrical schematic of an alternative embodiment of the sensing circuitry of the present invention.
Figure 13:
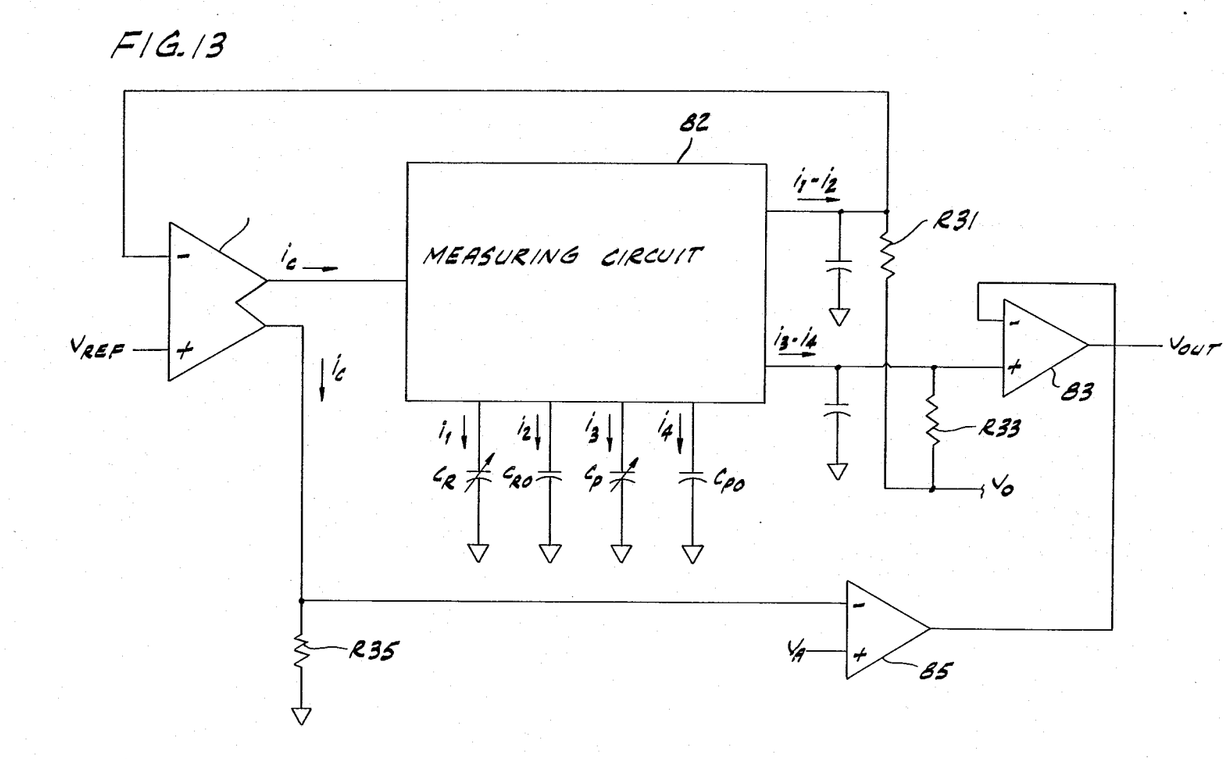
FIG. 13 is an electrical schematic illustrating the use of self-test circuitry in combination with the circuitry of FIG. 12.

The circuitry of FIGS. 12 and 13 uses integrated circuit techniques to provide a circuit simple enough to be implemented in a single integrated circuit with only a few external passive components. This results in a very low cost item which is excellently suited for automotive applications. Such monolithic integration allows the complete circuit to be installed inside the sensor electrode itself thus limiting stray capacitances and simplifying packaging and connections. Such a circuit also compensates for the dielectric constant variations and conductivity accurately over a wide temperature range. Moreover such an integrated circuit as described below is operable without modifications with a liquid having a dielectric constant as low as two (which is typical of oils and fuels) with no upper limit on the dielectric constant. Moreover, the circuit provides a single output directly proportion to the dielectric level, thereby eliminating the need for additional processing by microcomputer. Of course, stability over time and with respect to temperature is superior with an integrated device when compared to discrete circuits due to good device matching and tracking inside a single monolithic integrated circuit. As will become apparent, this circuitry of FIGS. 12 and 13 also ensures that the measuring capacitors and reference capacitors are kept at the same voltage at all times, thereby eliminating errors due to stray capacitance between them.

The monolithic integrated circuit of FIG. 12 includes a transconductance amplifier 71 having its noninverting input connected to a voltage reference VREF. The output of transconductance amplifier 71 is a current $i_c$ which is supplied to a conventional sawtooth oscillator 73. It should be realized that the amplifier and the sawtooth oscillator and the other units described herein are available sub-units used for building monolithic integrated circuits. The output of sawtooth oscillator 73 is a sawtooth waveform as shown which is supplied to the bases of a series of the npn type transistors Q21, Q22, Q23, and Q24, configured as emitter followers. The collector of transistor Q21 and the collector of transistor Q22 are connected to a differential current detector 75 made with a conventional current mirror so that the output labelled $i_1$ minus $i_2$ of the differential current detector 75 is in fact the difference between the current $i_1$ flowing through transistor Q21 and the current $i_2$ flowing through transistor Q22. The emitter of transistor Q21 is connected to the dielectric liquid filled capacitor CR which is used to compensate for variations in the dielectric constant of the fluid being measured. The emitter of transistor Q22 is connected to capacitor CRO, which has a capacitance which is calibrated to match the air filled capacitance of capacitor CR and compensate for stray capacitance to ground.

The output of differential current detector 75 is supplied to an RC network made up of a resistor R21 and a capacitor C21 which converts the output of detector 75 to a filtered voltage which is supplied to the inverting input of transconductance amplifier 71.

Similarly, the collector of transistor Q23 and the collector of transistor Q24 are connected to a differential current detector 77 whose output, labelled $i_3$ minus $i_4$, is a current equal to the difference between the current $i_3$ flowing through transistor Q23 and the current $i_4$ flowing through transistor Q24. The emitter of transistor Q23 is connected to the level sensing capacitor CP while the emitter of transistor Q24 is connected to the electronic capacitance CPO which is calibrated to match the air capacitance of capacitor CP and compensate for stray capacitance to ground. The output current of differential current detector 77 is converted to a filtered voltage VOUT by a network of a resistor R23 and a capacitor C23.

Saw-tooth oscillator 73 also controls a conventional discharge circuit 81 which is made of open collector transistors connected to the capacitors CR, CRO, CP, and CPO. This particular circuit ensures that these capacitors discharge simultaneously. Discharge circuit 81 also has conventional provision to limit the currents $i_1$, $i_2$, $i_3$, and $i_4$ during the discharge time to avoid current spikes in the output VOUT which could be the source of errors. The differential outputs $i_1$ minus $i_2$ and $i_3$ minus $i_4$ are nulled during discharge.

The operation of the circuitry of FIG. 12 is as follows. As discussed above, capacitor CR is always immersed in the dielectric liquid such as oil, in part because of the small gap width of this capacitor, which promotes a significant cling effect. This dielectric liquid filled capacitor CR is used with a measuring capacitor CP in which the liquid level varies with the height of the oil or fluid in the vessel. This particular arrangement compensates for variation of the dielectric constants in the various liquids whose level is being measured. The actual level of the liquid or the height of the portion of the measuring capacitor CP immersed in the liquid is given by the following equation:

$$L = \frac{h\,CRO}{CPO} \times \frac{(CP - CPO)}{(CR - CRO)} \quad (1)$$

where:
L is the level of the liquid or the height of the portion of the measuring capacitor immersed in the liquid;
h is the height of the dielectric liquid filled capacitor;
CR is the capacitance of the dielectric liquid filled capacitor in the liquid;
CRO is the capacitance of the dielectric liquid filed capacitor in air, i.e. when all the liquid is drained out of the capacitor;
CP is the capacitance of the measuring capacitor in the liquid; and
CPO is the capacitance of the measuring capacitor in air.

For a sensor of a given configuration, $$K = \frac{h\,CRO}{CPO} \quad (2)$$

where K is a constant reflecting the geometry of the sensor. Equation (1) becomes:

In the circuitry of FIG. 12, capacitors CRO and CPO are electronic capacitors calibrated to match the air-filled capacitances of their respective sensor capacitors and to compensate for stray capacitances to ground. The sawtooth oscillator 73 drives the emitter follower transistors Q21–Q24 so the capacitors CR, CRO, CP and CPO are forced to charge at the same rate, namely dv/dt.

The charging currents into these capacitors are given by the following relationships:

$$i_1 = CR \, dv/dt \quad (4)$$

$$i_2 = CRO \, dv/dt \quad (5)$$

$$i_3 = CP \, dv/dt \quad (6)$$

$$i_4 = CPO \, dv/dt \quad (7)$$

As mentioned above, differential current detector 75 supplies a current $i_1 - i_2$ to resistor R21 which converts the current to a voltage which is filtered by capacitor C21 and supplied to the inverting input of transconductance amplifier 71. This output signal of detector 75 is used as a feedback signal to the transconductance amplifier, whose output current $i_c$ controls the charging rate, dv/dt, of the sawtooth oscillator 73. This forms a closed-loop system which maintains the voltage across the resistor R21 equal to the fixed voltage reference $V_{REF}$.

$$V_{REF} = R21 \, (i_1 - i_2) \quad (8)$$

Thus, combining with equations (4) and (5):

$$V_{REF} = R21 \, dv/dt \, (CR - CRO) \quad (9)$$

This closed-loop system ensures that equation (8) is verified, regardless of the errors due to switching times or changes in the oscillator components with temperature.

The main error introduced by the circuit of FIG. 12 is the discharge time. This introduces a duty cycle factor DC and equation (9) then becomes:

$$V_{REF} = R21 \, DC \, dv/dt \, (CR - CRO) \quad (10)$$

Similarly, the output of the differential current detector 77 follows the relationship:

$$VOUT = R23 \, (i_3 - i_4)$$

or, combined with equations (6) and (7), and introducing DC:

$$VOUT = R23 \, DC \, dv/dt \, (CP - CPO) \quad (11)$$

Combining this with equation (3) yields:

$$VOUT = \frac{V_{REF}}{K} \, \frac{R23}{R21} \, L \quad (12)$$

$V_{REF}$ and the ratio R23/R21 determine the scale factor of the liquid level measurement circuit.

This circuit also compensates for the resistivity of a liquid which is not a perfect dielectric. In this case, the capacitors CR and CP will have resistances RR and RP in parallel respectively with the capacitances CR and CP. For a capacitor of area A and thickness d, the capacitance C and the resistance R are given approximately and sufficiently for most applications by:

$$C = EPSILON \, \frac{A}{d}$$

$$R = RHO \, \frac{d}{A}$$

where
EPSILON = dielectric constant of dielectric, and
RHO = resistivity of dielectric.

or:

$$R = \frac{RHO \, EPSILON}{C}.$$

If we apply this relationship to the dielectric liquid filled and measuring capacitors we obtain $$RR = \frac{EPSILON - EPSILON(0)}{CR - CRO} = \frac{M}{CR - CRO} \quad (14)$$

$$RP = \frac{EPSILON - EPSILON(0)}{CP - CPO} = \frac{M}{CP - CPO} \quad (15)$$

where
RHO = resistivity of the liquid,
EPSILON = dielectric constant of the liquid,
EPSILON(0) = dielectric constant of air, and
M = a constant.

As the capacitors CR and CP are charged at a rate dv/dt for a charge time t, the currents in the resistances RR and RP are equal to V/RR and V/RP and therefore have a sawtooth waveform similar to the voltage V across the capacitors CR, CRO, CP and CPO. When these currents are added to $i_1$ and $i_3$, equations (10) and (11) become:

$$V_{REF} = R21 \, DC \, dv/dt \, (CR - CRO + t/2RR) \quad (16)$$

and $$VOUT = R23 \, DC \, dv/dt \, (CP - CPO + t/2RP) \quad (17)$$

Combining equations (16) and (17) with equations (14) and (15) yields:

$$V_{REF} = R21 \, DC \, dv/dt \, (1 + t/(2 \, RHO \, M)) \, (CR - CRO) \quad (18)$$

$$VOUT = R23 \, DC \, dv/dt \, (1 + t/(2 \, RHO \, M)) \, (CP - CPO) \quad (19)$$

Combining equations (18) and (19) verifies that equation (12) is still true, thus proving that this circuit approach largely compensates for conductivity in the fluid.

The circuitry of FIG. 13 incorporates that of FIG. 12 and includes the necessary provisions for providing a self-test capability for the circuit. The two most probable failure causes are open contacts to the sensor capacitors CR and CP. Short circuits are not a very probable failure cause in this particular implementation of the invention since isolated electrodes are used in the sensor.

In FIG. 13, transconductance amplifier 71 provides two identical current outputs $i_c$. The first is supplied to a measuring circuit 82, which includes sawtooth oscillator 73, discharge circuit 81, emitter follower transistors Q21 through Q24, and differential current detectors 75 and 77 as described above in connection with FIG. 12. The other output $i_c$ is provided for self-test purposes.

The output currents $i_1 - i_2$ and $i_3 - i_4$ of measuring circuit 82 are converted to voltages by resistors R31 and R33 which are connected to a zero output voltage $V_0$. The output voltage is then buffered by an amplifier 83. The output voltage $V_{OUT}$ of the circuitry of FIG. 13 is between $V_0$ and the full scale voltage determined by the sensor geometry and the ratio of the resistors R31 and R33. Wiring failures between the sensor and the monitoring system cause the output to go to ground or to the positive supply voltage. A rupture of the connection to capacitor CP results in a low output voltage, as $i_3 - i_4$ becomes negative. A connection failure to capacitor CR causes transconductance amplifier 71 to saturate, supplying its maximum output current. This results in a high frequency of oscillation and a high gain in the detection circuits which results in an erroneous reading. To prevent this from happening, the current is monitored, converted to a voltage by a resistor R35, and compared to a fixed voltage $V_A$ by a comparator 85. If the current $i_c$ exceeds the maximum value, the open collector output stage of comparator 85 holds the output $V_{OUT}$ to ground, allowing detection of the faulty condition and hence providing a self-test means.

In view of the above, it will be seen that the objects of this invention are achieved and other advantageous results obtained.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A sensor for sensing the level of a dielectric liquid in a vessel such as oil, transmission fluid or the like comprising:

a sensor body adapted to be mounted with respect to the vessel containing the dielectric liquid whose level is to be measured;

a probe including first and second electrodes forming a level detecting capacitor, said probe being secured to the sensor body and being adapted to be at least partially immersed in the liquid, when liquid is present, to detect the level of the liquid, the capacitance of the level detecting capacitor being a function of the level of the dielectric liquid in which said level detecting capacitor is immersed;

a reference capacitor disposed in said sensor body such that its capacitance is not affected by the presence or absence of the dielectric liquid, the capacitance of said reference capacitor being substantially the same as the capacitance of the level detecting capacitor when no dielectric liquid is present between the electrodes of the level detecting capacitor;

an oscillator mounted in the sensor body for providing a rectangular waveform having a charging portion and a second portion, and means for directly applying the waveform to each of said capacitors to charge the capacitors during the charging portion of each cycle of the waveform and to allow the capacitors to discharge during the second portion of each cycle;

capacitance measuring means for measuring the capacitance of each capacitor whose capacitance is to be measured, said measuring means providing an output signal having a parameter proportional to the measured capacitance of each capacitor and which signal is unaffected by the charge on each such capacitor during the charging portion of the rectangular waveform provided by the oscillator; and subtracting means for effectively subtracting the signal parameter representing the capacitance of said reference capacitor with respect to the signal parameter representing the capacitance of the level detecting capacitor to give a resulting signal representative of the level of the dielectric liquid at the sensor.

2. The sensor as set forth in claim 1 wherein the reference capacitor is a temperature stable, NPO-type capacitor.

3. The sensor as set forth in claim 1 wherein the oscillator is a relaxation oscillator comprised of components having leakage currents substantially lower than those of diodes and current sources under high temperatures.

4. The sensor as set forth in claim 1 wherein said capacitance measuring means includes a separate measurement circuit for each capacitor.

5. The sensor as set forth in claim wherein the capacitance measuring means includes a plurality of comparators comprised of components having leakage currents substantially lower than those of diodes and current sources under high temperatures.

6. The sensor as set forth in claim 5 wherein one input of each comparator is connected to a respective RC-network, each RC-network including a capacitor whose capacitance is being measured, and the other input of each comparator is connected to a voltage reference course, whereby in each cycle of the oscillator the output of each comparator is a pulse whose width is proportional to the respective capacitance being measured.

7. The sensor as set forth in claim 6 wherein the output of each comparator is connected to a low pass filter so that the output of the capacitance measurement circuit is a direction current voltage proportional to the capacitance of the capacitor being measured.

8. The sensor as set forth in claim 6 wherein each comparator is synchronized with the oscillator so that the output of each comparator is unaffected by the charge on its respective capacitor during the charging portion of the waveform provided by said oscillator.

9. The sensor as set forth in claim 1 wherein the subtracting means is comprised of components having leakage currents substantially lower than those of diodes and current sources under high temperatures.

10. The sensor as set forth in claim 1 further including means for testing whether the reference capacitor is operating properly.

11. The sensor as set forth in claim 10 wherein the testing means includes means for supplying a reference voltage to the subtracting means in place of the signal parameter representing the capacitance of the level detecting capacitor, whereby the output of the subtracting means is a function of whether the reference capacitor is operating properly.

12. The sensor as set forth in claim 11 wherein said the capacitance measuring means includes a plurality of comparators, the signal parameter representing the capacitance of the reference capacitor is a voltage, and including a reference voltage supplied to the comparators, the reference voltage being less than the voltage representing said capacitance with the reference capacitor is operating properly.

13. The sensor as set forth in claim 12 wherein the reference voltage supplying means includes an externally operable switching device connected between the reference voltage source and an input of the comparator so that the application of the reference voltage to the comparator may be externally controlled.

14. The sensor as set forth in claim 10, wherein the testing means includes means for detecting a break in the circuit between the level detecting capacitor and the capacitance measuring means.

15. The sensor as set forth in claim 1 further including a third electrode disposed in the probe at a position in which the third electrode is normally surrounded by the dielectric liquid, wherein the third electrode is radially spaced from and coaxial with one of the first or second electrodes to form a third, dielectric liquid filled capacitor whose capacitance is normally a function of the dielectric constant of the particular dielectric liquid whose level is being sensed;

further including a second reference capacitor disposed in the sensor such that its capacitance is not affected by the presence or absence of the dielectric liquid, the capacitance of the second reference capacitor being substantially the same as the capacitance of the third capacitor when no dielectric liquid is present between the electrodes of the third capacitor wherein said oscillator applies the waveform to the third dielectric filled capacitor and the second reference capacitor, and the capacitance measuring means measures the capacitance of the third dielectric filled capacitor and the second reference capacitor and has output signals with parameters proportional to the measured capacitances of each of the capacitors;

further including second means for substracting the signal parameter representing the capacitance of the second reference capacitor from the signal parameter representing the capacitance of the dielectric filled capacitor to give a signal proportional to the dielectric constant of the dielectric liquid, the ratio of the signals from the first subtracting means and the second subtracting means being substantially independent of the dielectric constant of the dielectric liquid.

16. The sensor as set forth in claim 15 including means for detecting a break in the circuit between the third capacitor and the capacitance measuring means.

17. A sensor as set forth in claim 15, wherein the gap between the electrodes of the third, dielectric filled capacitor is sized to provide significant clinging of the dielectric liquid between the electrodes when the level of liquid in the vessel falls below the level of the third capacitor.

18. The sensor as set forth in claim 1 wherein the sensor body is electrically isolated from the vessel.

19. The sensor as set forth in claim 1 wherein the first and second electrodes have a gap having a predetermined width therebetween, further including a second capacitor having a pair of electrodes having a gap therebetween smaller than the gap between the first and second electrodes, the gap width of the second capacitor being selected to allow flow of dielectric liquid therein but being small enough to significantly retain dielectric liquid in the gap of the second capacitor as the level of the dielectric liquid in the vessel falls below the level of the top of the second capacitor.

20. The sensor as set forth in claim 1 wherein the measuring means and the subtracting means are disposed in a monolithic integrated circuit having only passive external components.

21. The sensor is set forth in claim 1 further including means for compensating for variations in conductivity of the dielectric liquid.

22. The sensor as set forth in claim 1 further including means for keeping the capacitors whose capacitance is to be measured at the same voltage at all times.

23. The sensor as set forth in claim 1 wherein the subtracting means includes a differential current detector, the output of said detector being the difference between the currents flowing to the level detecting capacitor and to the reference capacitor.

24. The sensor as set forth in claim 23 further including means for generating an output voltage from the output of the detector, said output voltage being representative of the level of the dielectric liquid.

25. A sensor as set forth in claim 1 wherein said capacitance measuring means determines the time it takes each capacitor whose capacitance is to be measured to discharge below a reference level.

26. A sensor as set forth in claim 25 wherein the oscillator is a relaxation oscillator comprised of components having leakage current substantially lower than those of diodes and current sources under high temperatures.

27. A sensor as set forth in claim 25 wherein the capacitance measuring means includes a plurality of comparators having one input connected to a respective RC-network, each RC-network including a capacitor whose capacitance is being measured, and a second input connected to a voltage reference source, whereby in each cycle of the oscillator the output of each comparator is a pulse whose width is proportional to the respective capacitance being measured.

28. A sensor as set forth in claim 27 wherein each comparator is synchronized with the oscillator so that the output of each comaprator is unaffected by the charge on its respective capacitor during the charging portion of the waveform provided by said oscillator.

29. The sensor as set forth in claim 1 wherein the outputs of the capacitance measuring means are direct current voltages proportional to the capacitance of the capacitor being measured.

30. A sensor as set forth in claim 1, wherein said oscillator, capacitance measuring means, and substracting means includes components having leakage currents substantially lower than those of diodes and current sources under high temperature conditions, whereby the level of the dielectric liquid sensed by the sensor is relatively unaffected by the temperature of the liquid.

31. A sensor as set forth in claim 1, wherein the reference capacitor is closed so that its capacitance is independent of the level of the dielectric liquid.

32. A sensor for sensing the level of a dielectric liquid such as oil, transmission fluid or the like comprising:
a sensor body adapted to be mounted with respect to a vessel containing the dielectric liquid whose level is to be measured;
a probe, including first and second electrodes forming a level detecting capacitor, said probe being secured to the sensor body and being adapted to be at least partially immersed in the liquid, when liquid is present, to detect the level of the liquid;
means for measuring the capacitance of the capacitor and for deriving from the capacitance measurement a signal representative of the level of the dielectric liquid at the sensor; and said first and second electrodes being radially spaced apart and coaxial with each other, said second electrode being interior of the first, the spacing between the two electrodes forming at least two distinct regions and having at least two significantly different values as measured at different longitudinal positions along the probe so that the capacitance of the level detecting capacitor per unit length varies longitudinally along the probe, the spacing in one of the regions being sized so that the dielectric liquid in that region clings between the electrodes such that the liquid level in that region remains constant during normal operation of the probe irrespective of the level of the liquid, whereby the capacitance of that region is a function of the dielectric constant of the liquid rather than the level of the liquid.

33. The sensor as set forth in claim 32 wherein the sensor is particularly adapted for use with an internal combustion engine, a transmission or the like, said level detecting capacitor having a third distinct region adjacent the other regions and in which the spacing between the two electrodes is relatively small so that the third region is relatively sensitive to changes in the level of the dielectric liquid, said third region being disposed along the probe at a position at which the absence of oil or transmission fluid indicates a catastrophic loss of dielectric liquid.

34. The sensor as set forth in claim 33 including a fourth region, and wherein the spacing between the electrodes in two of the regions is substantially the same.

35. The sensor as set forth in claim 33 wherein the spacing between the electrodes is said one region is smaller than the spacing between the electrodes in any of the other regions.

36. A system for detecting the level of a dielectric liquid comprising:
   a first capacitor having a pair of electrodes adapted to be disposed so that the dielectric liquid whose level is to be measured may flow between the electrodes, whereby the capacitance of the first capacitor varies with the level of the dielectric liquid;
   a second capacitor so constructed and arranged that its capacitance is independent of the level of the dielectric liquid, said capacitance of the second capacitor being a reference generally equal to the capacitance of the first capacitor in air with no dielectric liquid present between its electrodes;
   a third capacitor having a pair of electrodes adapted to be immersed in the electric liquid for detecting the dielectric constant thereof, whereby the capacitance of the third capacitor is a function of the dielectric constant of the liquid rather than of the level of the liquid;
   a fourth capacitor so constructed and arranged that its capacitance is independent of the level of the dielectric liquid, said capacitance of the fourth capacitor being a reference generally equal to the capacitance of the third capacitor in air with no dielectric liquid between its electrodes;
   means for applying a waveform to all four capacitors in such a manner that all four capacitors are at substantially the same instantaneous voltage during charging, so that the capacitance of each capacitor is directly reflected in the charging current flowing into that capacitors;
   means for comparing the difference between the third and fourth capacitor charging currents to a reference, and for providing a comparing means output for controlling the output of the waveform applying means; and
   output means responsive to the charging currents for generating an output signal representative of the level of the dielectric liquid.

37. The system as set forth in claim 36 wherein the waveform applying means includes four transistors, each being associated with its own one of the four capacitors, and an oscillator for supplying the waveform to simultaneously control the conduction of the four transistors so that the charging voltage applied to each capacitor is instantaneously the same.

38. The system as set forth in claim 37 further including means responsive to the charging currents to the third and fourth capacitors for detecting the difference in those two charging currents.

39. The system as set forth in claim 37 further including feedback means responsive to the charging currents to the third and fourth capacitors for controlling the output of the oscillator.

40. The system as set forth in claim 37 wherein the oscillator is a sawtooth oscillator.

41. The system as set forth in claim 36 wherein the output means includes a differential current detector effectively connected to the first and second capacitors for detecting the difference between the charging currents to the first and second capacitors.

42. The system as set forth in claim 36 further including self-test means for detecting a break in continuity of the circuit between the first or the third capacitors and their charging means.

43. The system as set forth in claim 36, further including self-test means for detecting a break in continuity of external circuitry connected to the system.

44. A system as set forth in claim 36 wherein the means for applying a waveform includes an oscillator for supplying a waveform output.

45. A system as set forth in claim including a feedback loop from the third and fourth capacitor comparing means for controlling the rate of the oscillator.

46. A system as set forth in claim 45 wherein the means for comparing the difference between the third and fourth capacitor charging currents includes means for converting said difference to a voltage signal, and wherein said reference is a voltage reference.

47. A system as set forth in claim 46 wherein the feedback loop includes a transconductance amplifier which performs the comparison with the voltage reference, the output of the transconductance amplifier controlling the output of the oscillator for applying a time-varying waveform to the capacitors.

48. A system as set forth in claim 36 including a differential current detector for detecting the difference between the currents flowing to the level detecting first capacitor and the second capacitor.

49. A system as set forth in claim 48 further including a second differential current detector for detecting the difference between the currents flowing to the third capacitor and the fourth capacitor.

50. The system as set forth in claim 48 wherein the output of the differential current detector is a current, and further including means for converting said output of the detector to a filtered voltage to provide an output signal representative of the level of the dielectric liquid.

51. A system as set forth in claim 36 wherein the gap between the electrodes of the third capacitor is sized to provide significant clinging of the dielectric liquid between the electrodes when the level of liquid in the vessel falls below the level of the third capacitor.

52. A system for detecting the level of a dielectric liquid comprising:
- a level detecting capacitor having a pair of electrodes adapted to be disposed so that the dielectric liquid whose level is to be measured may flow between the electrodes, whereby the capacitance of the first capacitor varies with the level of the dielectric liquid;
- a dielectric constant detecting capacitor having a pair of electrodes adapted to be immersed in the dielectric liquid for detecting the dielectric constant thereof, whereby the capacitance of the third capacitor is a function of the dielectric constant of the liquid rather than of the level of the liquid;
- reference capacitor means for providing capacitance independent of the level of the dielectric liquid and substantially equal to the capacitance of said capacitors in air with no dielectric liquid between their electrodes;
- means for applying a waveform to the capacitors and the reference capacitor means in such a manner that they are at substantially the same instantaneous voltage during charging, so that end capacitance is directly reflected in the charging current flowing into the respective capacitor or reference capacitor means;
- means for comparing the difference between the charging currents of the dielectric constant detecting capacitor and the associated reference capacitor means to a reference, the output of the comparing means controlling the output of the waveform applying means; and
- output means responsive to the charging currents for generating an output signal representative of the level of the dielectric liquid.

53. A sensor for sensing the level of a dielectric liquid in a vessel comprising:
- a sensor body adapted to be mounted with respect to the vessel containing the dielectric liquid whose level is to be measured;
- a probe including first and second electrodes forming a level detecting capacitor, said probe being secured to the sensor body and being adapted to be at least partially immersed in the liquid, when liquid is present, to detect the level of the liquid, the capacitance of the level detecting capacitor being a function of the level of the dielectric liquid in which said level detecting capacitor is immersed;
- a reference capacitor disposed in said sensor body such that its capacitance is not affected by the presence or absence of the dielectric liquid, the capacitance of said reference capacitor being substantially the same as the capacitance of the level detecting capacitor when no dielectric liquid is present between the electrodes of the level detecting capacitor;
- means for applying a waveform to each of said capacitors to charge the capacitors during a charging portion of each cycle of the waveform and to allow the capacitors to discharge during a second portion of each cycle;
- capacitance measuring means for measuring the capacitance of each capacitor whose capacitance is to be measured, said measuring means providing an output signal having a parameter proportional to the measured capacitance of each capacitor and which signal is unaffected by the charge on each such capacitor during the charging portion of the waveform; and
- subtracting means for effectively subtracting the signal parameter representing the capacitance of said reference capacitor with respect to the signal parameter presenting the capacitance of the level detecting capacitor to give a resulting signal representative of the level of the dielectrical liquid at the sensor.

* * * * *

UNITED STATES PATENT AND TRADEMARK OFFICE
CERTIFICATE OF CORRECTION

PATENT NO. : 4,806,847

DATED : February 21, 1989

INVENTOR(S) : Kim W. Atherton et al.

It is certified that error appears in the above-identified patent and that said Letters Patent is hereby corrected as shown below:

Claim 5, line 1 (column 18), insert --1-- after "claim".

Claim 6, line 6 (column 18), delete "course" and insert --source--.

Claim 7, line 4 (column 18), delete "direction" and insert --direct--.

Claim 15, line 25, (column 19), delete "substracting" and insert --subtracting--.

Claim 26, line 3 (column 20), delete "current" and insert --currents--.

Claim 36, line 15 (column 21), delete "electric" and insert --dielectric--.

Claim 36, line 31 (column 21), delete "capacitors;" and insert --capacitor;--.

Claim 45, line 1 (column 22), insert --44-- after "claim".

Claim 52, line 23 (column 23), delete "end" and insert --each--.

Claim 53, line 38 (column 24), delete "presenting" and insert --representing--.

Signed and Sealed this

Twenty-first Day of November, 1989

Attest:

JEFFREY M. SAMUELS

Attesting Officer     Acting Commissioner of Patents and Trademarks